May 21, 1946.    B. C. FISHER    2,400,747
AUTOMATIC COMPRESSION CONTROL FOR INTERNAL-COMBUSTION ENGINES
Filed Oct. 26, 1940    2 Sheets-Sheet 1
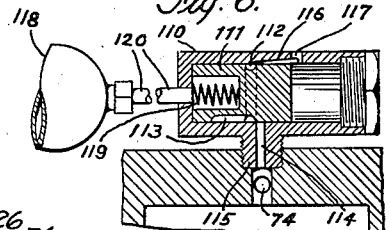
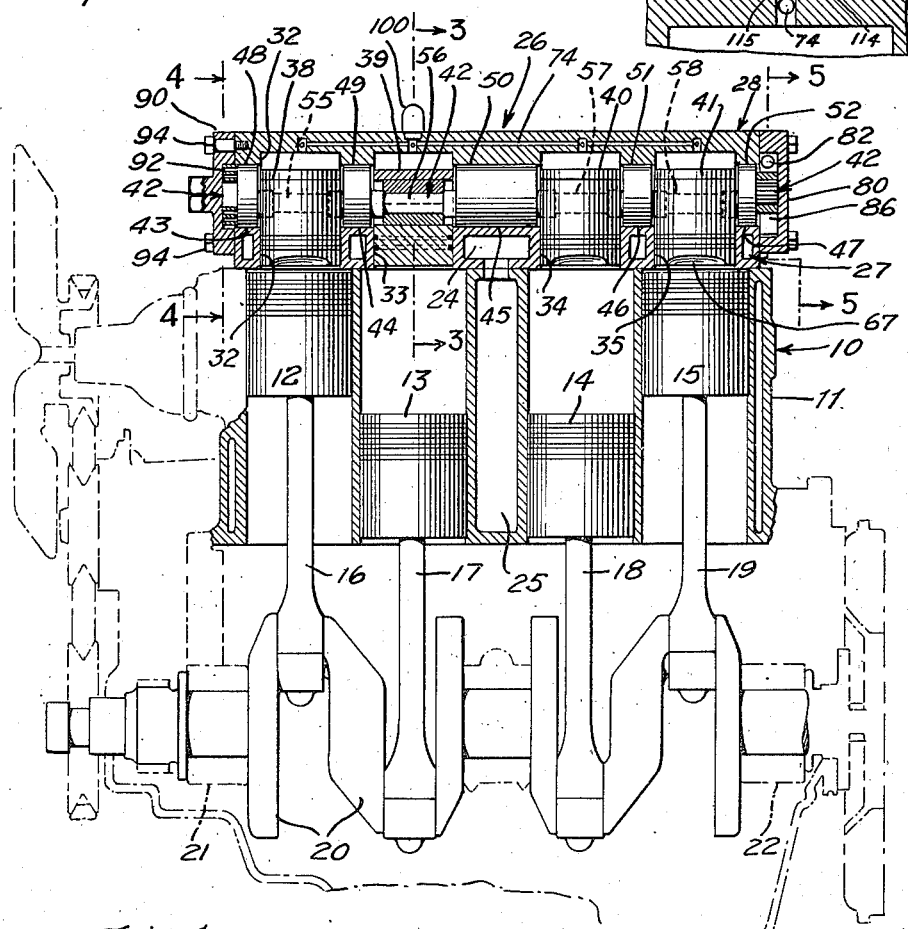
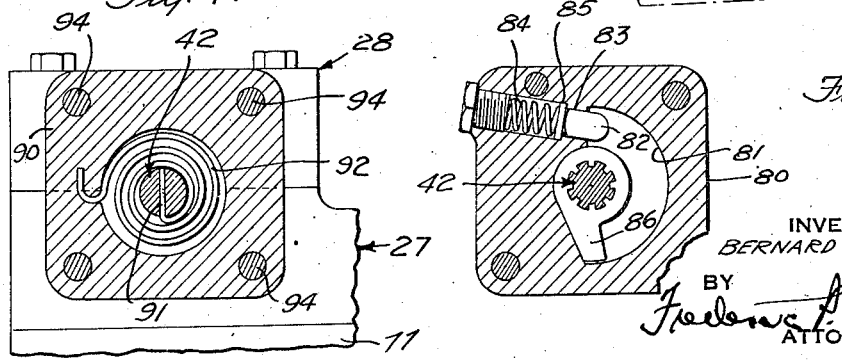
INVENTOR
BERNARD C. FISHER.
BY
ATTORNEY

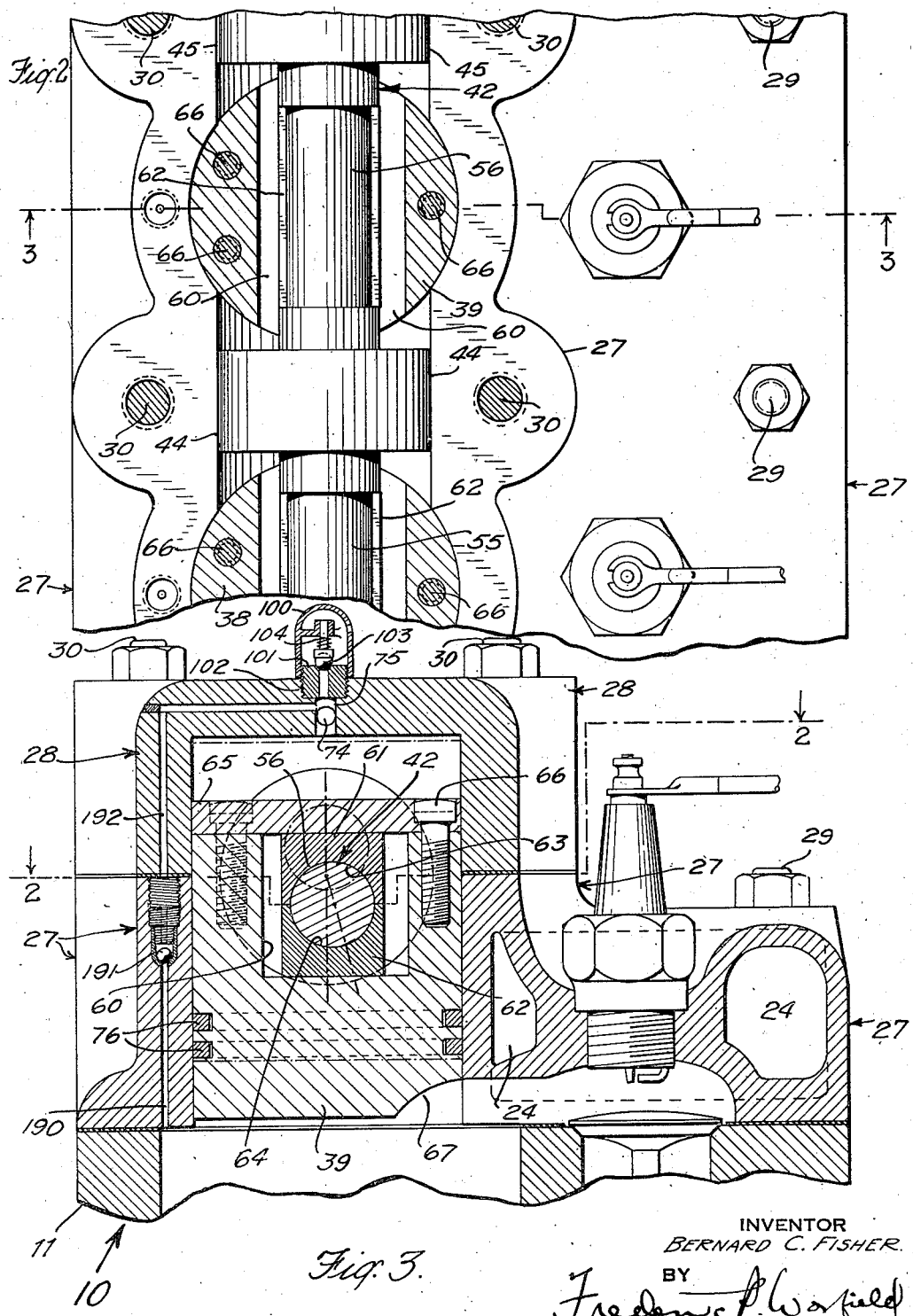

Patented May 21, 1946

2,400,747

UNITED STATES PATENT OFFICE 2,400,747

AUTOMATIC COMPRESSION CONTROL FOR INTERNAL-COMBUSTION ENGINES

Bernard C. Fisher, Jersey City, N. J., assignor to Charles H. Warfield, Westfield, N. J., Frederick P. Warfield, Goldens Bridge, N. Y., and Bernard C. Fisher, Jersey City, N. J., as trustees Application October 26, 1940, Serial No. 362,901

11 Claims. (Cl. 123—48)

This invention relates to internal combustion engines and especially to mechanism for controlling the compression in such engines.

An object of the invention is to provide an internal combustion engine which when used in a vehicle will increase the mileage per gallon of fuel over engines heretofore used therein.

Another object of the invention is to provide an internal combustion engine which, under average conditions, will operate at a lower temperature than those heretofore used.

Another object of the invention is to provide an internal combustion engine which will operate at maximum efficiency regardless of the load on said engine.

A further object of the invention is to provide an internal combustion engine with means for adjusting the size of the combustion chamber in accordance with load conditions, whereby detonation is prevented.

Another object of the invention is to provide an internal combustion engine with adjustable combustion spaces having means actuated by fluid pressure to withstand the shock of the explosion.

Still another object of the invention is to provide an internal combustion engine with an auxiliary cylinder and cooperating piston associated with each working cylinder of said engine, and with mechanical means to oppose movement of said pistons, said means increasing in effectiveness as said pistons near the ends of their strokes.

Still another object of the invention is to provide a multiple cylinder internal combustion engine with automatic means to adjust simultaneously the size of the combustion spaces of all the cylinders.

Still another object of the invention is to provide a head for an internal combustion engine with automatic means to adjust the size of the combustion space therein in accordance with load conditions.

A further object of the invention is to provide a head for an internal combustion engine with means to utilize the pressure developed in the combustion chambers thereof to control the size of said combustion chambers.

The invention accordingly comprises the features of construction, combinations of elements, and arrangement of parts, which will be exemplified in the constructions hereinafter set forth, and the scope of the application of which will be indicated in the claims.

For a fuller understanding of the nature and objects of the invention reference should be had to the following detailed description, taken in connection with the accompanying drawings, in which:

Fig. 1 is a sectional elevational view of an internal combustion engine embodying the invention, certain parts being shown in dotted lines;

Fig. 2 is an enlarged sectional view of a portion of the engine of Fig. 1 taken on line 2—2 of Fig. 3;

Fig. 3 is an enlarged sectional view through one of the cylinders of the engine of Figs. 1 and 2 taken substantially on the lines 3—3 of Figs. 1 and 2;

Fig. 4 is a sectional view taken on line 4—4 of Fig. 1 and showing the spring mechanism at the end of the auxiliary shaft;

Fig. 5 is a sectional view taken on line 5—5 of Fig.1 and showing the stop mechanism for the auxiliary shaft; and Fig. 6 is a modification of a relief valve controlled by an intake manifold.

Referring now more specifically to the drawings the invention is shown incorporated in an automobile engine 10 having the usual type of cylinder block 11 with pistons 12, 13, 14, and 15 connected respectively by suitable connecting rods 16, 17, 18, and 19 to a crank shaft 20 which is mounted in bearings 21 and 22 and surrounded by a crank casing 23. All of the associated equipment, such as valves, cam shaft, cam shaft drive, fan, fan belt, generator, and starter, are the same as for the conventional type of automobile engine.

In the particular engine used for illustrative purposes, the invention is incorporated in the cylinder head 26 which is made in two main parts, a main body portion 27 and a cover portion 28. The main body portion 27 has substantially the same bottom configuration as an ordinary cylinder head and is adapted to fit upon the top of the cylinder block 11 and to be held in place thereon by the stud bolts 29 and 30. However, the portion 27 is thicker than an ordinary cylinder head and is provided with auxiliary cylinders 32, 33, 34, and 35 spaced in the block so as to communicate with the main pistons 12, 13, 14, and 15 respectively, compartments 24 being provided to form water jackets substantially surrounding the cylinders 32, 33, 34, and 35 and communicating with the usual water jackets 25 in the cylinder block 11. These auxiliary cylinders are provided with auxiliary pistons 38, 39, 40, and 41 which are adapted to have a limited reciprocating movement within the cylinders so as to alter the size of the spaces above the main pistons. Unlike the main pistons, auxiliary pistons 38, 39, 40, and 41 are maintained in alignment with each other and are caused to move simultaneously. To this end they are mounted on an auxiliary crank shaft 42 which extends substantially parallel to the main crank shaft 20 and which rotates on bearing surfaces 43, 44, 45, 46, and 47, provided in the main body portion 27, the shaft being held in place by the cover portion 28 which is provided with cooperating bearing surfaces 48, 49, 50, 51, and 52.

The auxiliary shaft 42 is provided with aligned eccentric portions 55, 56, 57, and 58, each of which lies between two of the bearing surfaces and each of which is adapted to extend completely through one of the auxiliary pistons in which it is rotatably mounted by means of a scotch yoke arrangement, best shown in Figs. 2 and 3. In Fig. 3 the auxiliary piston 39 is shown in enlarged section with the eccentric portion 56 of the auxiliary shaft 42 extending through the center thereof. At this point a lateral slot 60 is cut into the top of the piston to receive the eccentric portion 56 of the auxiliary crank shaft, and a bearing of pillow blocks 61 and 62, having semi-cylindrical bearing surfaces 63 and 64, respectively, to fit the curvature of the eccentric portion 56, are placed one below the other around the shaft in the manner shown, the two blocks holding the shaft between them. The width of the blocks 61 and 62 is such that the blocks, together with the shaft, can move from side to side, as viewed in Figs. 2 and 3 within the slot 60. The blocks, however, are held in the slot 60 by a cover plate 65 which is secured against the top of the piston 39 by means of screws 66 and prevents movement of the pillow blocks in an axial direction.

Because of the eccentricity of the piston engaging portion 56 the center of this portion will tend to move in a circle when the shaft is rotated. Insofar as certain sidewise components of this movement are concerned, the shaft, together with the blocks 61 and 62, are free to move with respect to the piston 39, but any components of this movement in an axial direction of the piston will force the piston to move axially, because the pillow blocks 61 and 62 are held between the inner end of the slot 60 and the cover plate 65, as will be evident from an inspection of Fig. 3.

The position of the auxiliary crank shaft 42 and the amount of eccentricity of the piston carrying bearing members 55, 56, 57, and 58, is such that the auxiliary pistons 38, 39, 40, and 41 will have a slight clearance between their lower ends and the upper ends of the main pistons 12, 13, 14, and 15, when the auxiliary pistons are in their lowermost positions and the main pistons are in their uppermost positions. The size of the head cover plate 28 is also such that there will be a space between the piston cover plate 65 and the inner side of the head cover plate 28, when the auxiliary pistons are in their uppermost position.

In designing the engine of the invention, care should be taken to permit free access of the explosive mixture into the combustion space. In Fig. 3 I have shown the auxiliary piston 39 cut away at its lower right edge, as indicated at 67, and the inner surface of the head shaped to conform therewith. When the auxiliary piston is in any position the mixture can pass freely into the combustion space. The same result may be accomplished by positioning the auxiliary cylinder and piston so as to straddle the working cylinder and inlet valve. In this latter case the piston need not be cut away. The spark plug, of course, would be positioned at any suitable place in the head.

It is desired to connect the upper ends of the cylinders 32, 33, 34, and 35 in the cover plate 28, so that pressure may be transmitted between them, and for this purpose a communicating duct 74 is provided extending throughout the length of the cover plate and communicating with each cylinder, as by the opening 75. Any pressure developed in the upper end of any one of these cylinders is therefore transmitted to the others.

The auxiliary pistons are arranged to fit snugly within the auxiliary cylinders and I preferably provide piston rings 76 on each of these pistons. However, I prefer not to have these pistons fit too tightly for a reason to be explained hereafter, and therefore it is unnecessary to exercise much care in the fitting of these parts.

The crank shaft 42 is adapted to oscillate through an angle slightly less than 180° so that the eccentric bearings move only on one side of the center of rotation of the shaft, for the purpose of permitting the auxiliary pistons to move from their lowermost position to their uppermost position. It is desired, however, to prevent the auxiliary pistons from stopping on dead center, and therefore a stop is provided which will keep the shaft a few degrees off of dead center at the lowermost position of the pistons, and additional means is provided to urge the shaft off of dead center at their uppermost position.

The arrangement for accomplishing this purpose is shown most clearly in Figs. 1 and 5. These figures show the end plate 80 which bears against one end of the shaft and thus aids in preventing axial displacement thereof. This plate is provided on its inner side with an arcuate groove 81 at one end of which is provided a spring pressed plunger 82 extending into the groove, the plunger being mounted in a cavity 83 provided for that purpose. The plunger is normally held in that position by the spring 84 and is prevented from passing into the groove by the shoulder 85. A suitable cap nut is provided to close the cavity 83.

A lug 86 is splined on the end of the auxiliary shaft 42 for movement in the arcuate groove 81. The arrangement of the parts is such that the lug 86 will engage the spring pressed plunger 82 when the pistons are at about 10° of their uppermost position and will push the plunger into the cavity against the tension of the spring when the dead center position of the shaft is reached. Thus the spring will always urge the shaft away from dead center. Also the lug 86 will engage the other end of the groove 81 when the pistons have not quite reached their lowermost dead center position. I have found that it is preferable to stop the pistons at about ten degrees off dead center at this point.

Under certain conditions I may desire to eliminate the structure shown in Figs. 4 and 5 and use the pillow blocks 61 and 62 to stop the upward and downward movement of the auxiliary pistons. This may be done by providing the left wall of the slot 60, as viewed in Fig. 3, at such a position that the pillow blocks will contact it when the shaft is about 10° off dead center at the uppermost and lowermost portion of the pistons, thereby preventing locking on dead center. Gases are compressed in the space between the pillow blocks and the left wall of the slot 60 to provide a cushioning effect at all times, so that the action of the mechanism is steadied. Even if the stops for the shaft are used, the cushioning effect is present.

I also preferably provide means normally to urge the pistons towards their uppermost position, which has the double purpose of preventing chattering of the pistons in operation and of causing the pistons to move to their uppermost positions if leaks or other faults should develop in use. This means is shown in Figs. 1 and 4, where the other end plate 90 bears against the opposite end of the shaft 42. The shaft is provided with a slot 91 in which the inner end of a flat coil spring 92 fits. The outer end of the spring is secured to the housing which forms part of the end plate 90 and the end plate is secured to the head 26 by suitable means, such as screws 94. The tension of the spring 92 should be just sufficient to overcome motor suction.

In the operation of the engine the main pistons and cylinders operate in accordance with standard practice. An ignitable gas mixture is delivered to each cylinder through its associated intake valve as the piston moves downwardly on its intake stroke, and this mixture is compressed as the piston rises for the compression stroke. Assuming that the engine has been at rest for some time, the auxiliary pistons will all be in their uppermost positions, moved there by the action of the spring 92 and permitted by slight leakage around the rings 76. When the engine starts, gases leak up past the piston rings 76 into the spaces above the auxiliary pistons, and in a few seconds after starting, the pressure in these spaces is substantially increased to a pressure governed by the pressure produced in the working cylinders by the explosions. Since the pressure in the spaces above the auxiliary pistons is controlled by the explosive pressure in the main cylinder and at any given instant maximum pressure is under only one of the pistons, they all move down to a lower position, provided the load and fuel charge is not then maximum, and they will remain there as long as the load and fuel supply remain constant and are not maximum. These conditions will prevail with the engine idling.

If it is now desired to start the car, and the clutch is released and the motor begins to pick up the load, the throttle will be opened to feed more gas to the engine. The increased gas supply to the main cylinders of the engine will increase the compression and also increase the force of the explosion against the auxiliary pistons. The auxiliary pistons will then rise, compressing the gases in the space above them and providing increased combustion space for the main cylinders below them so that detonation is prevented, even though the throttle is opened all the way.

The compressed gases in the spaces above the auxiliary pistons resist upward movement of the pistons, but such movement is also resisted by the mechanical connection between the pistons and auxiliary shaft. It will be noted that when the auxiliary pistons are at their lowermost positions, the eccentric members to which the pistons are connected are near their lowermost dead center position. The shock against an auxiliary piston caused by an explosion is therefore largely taken up by the auxiliary shaft itself. As the pistons rise, the eccentrics move away from dead center and the mechanical resistance to movement becomes less and less until the half-way point is reached. As the pistons continue to rise, the mechanical resistance increases again, until at upper dead center the auxiliary shaft can carry all the pressure exerted against the auxiliary pistons.

As soon as the car gets up to speed and the throttle is partially closed the explosion pressure will be less beneath the auxiliary pistons and the gases compressed above them will force them downwardly, thereby reducing the combustion space. At the same time the closing of the throttle delivers less gas to the main cylinders.

The above mentioned cycle takes place whenever the gears are shifted and the gas supply to the engines increased, or whenever the car approaches a hill, or for any reason an extra load is put on the motor so that the throttle is opened further. Under these conditions the additional gas in the cylinders and the increase of explosive force will drive the auxiliary pistons upwardly, as has already been described, so that there is greater combustion space, and the possibility of detonation is reduced, if not entirely eliminated. Thus the maximum efficiency of the engine will be maintained during various conditions of operation.

Under certain conditions the pressure above the auxiliary pistons may build up too high. This may occur when it is necessary to hold the throttle wide opened for a long period of time when a heavy load is on the engine. To prevent this pressure from getting too high I provide a relief valve which I connect to the space above the auxiliary pistons and which I adjust for operation under certain pre-arranged conditions. This valve, as indicated in Fig. 3, may comprise a hollow fitting 100 having a threaded extension 101 adapted to be screwed into a tapped hole 102 in the cover portion 28, the hole 102 communicating with the duct 74. The opening through the extension 101 is normally closed by a ball 103 held in position by a spring 104. The interior of the fitting is open to the atmosphere and the pressure above the auxiliary pistons will therefore never increase beyond that sufficient to overcome the pressure of the spring 104. The spring is therefore adjusted to prevent detonation under maximum load conditions, in which case the auxiliary pistons will automatically maintain the proper compression for maximum efficiency.

The size of the space above the auxiliary pistons and the size and throw of the pistons themselves may be calculated to give the proper increase and decrease in the size of the combustion space at the proper times.

Since maximum compression occurs when the throttle is open widest and there is least vacuum in the intake manifold, the relief valve may be controlled from the pressure in the intake manifold. An arrangement for doing this is illustrated in Fig. 6. Here the fitting 110 is provided with a plunger 111 having a groove 112 around its circumference opening into a slot 113 extending axially of the plunger from the groove to a point near one end. When the plunger is in one position the groove is aligned with an opening 114 which is connected to the space above the auxiliary pistons by means of a suitable threaded nipple 115, and also with a tapered slot 116, formed in the inner wall of the fitting 110 and open at the large end to the atmosphere by means of the opening 117. A spring 119 tends to maintain the plunger in this position. The end of the fitting is connected by means of the tube 120 to the intake manifold 118 so that the vacuum, usually present in the manifold, will pull the plunger against the tension of the spring to close the openings 114 and 117. Any sudden opening of the throttle to take care of increased loads will lower the vacuum in the intake manifold and permit the spring 119 to move the plunger 111 to the right, so that the groove 112 and slot 113 align with the opening 114 and slot 116, thus relieving the excess pressure above the auxiliary pistons. The spring is made sufficiently strong to permit this action to take place just before detonation would otherwise occur.

If desired the slot 116 may be so shaped that a variation in pressure release may be obtained as the plunger moves by the action of the spring under depressed manifold conditions. Thus a decrease of vacuum from part load condition will open the vent proportionately.

In both Figs. 3 and 6 the opening to the atmosphere for relieving the pressure should be of such a size that there will be enough pressure above the auxiliary pistons at high speeds to maintain the pistons in their lowermost positions.

I have already explained that the pressure in the combustion space developed by the explosions causes gases to leak past the piston rings on the auxiliary pistons and develops the pressure above these pistons which causes them to operate in the manner described. However, this leakage need not be relied on, if desired. In Fig. 3 I have shown means to supply the necessary pressure above the auxiliary pistons in a positive manner, regardless of the tightness of the fit of the pistons in the cylinders. This means comprises a duct 190 extending through the head portion 27 so that it opens into the main combustion space. The upper end of the duct is enlarged to receive a ball valve 191 which permits gases to flow outwardly from the combustion space but prevents them from flowing in the other direction. The cover portion 28 is also provided with a cooperating duct 192 connecting the ball valve with the duct 74 which leads to all the auxiliary cylinders above the auxiliary pistons. The duct 190 may be provided in one cylinder only, or each of the auxiliary cylinders may have its own communicating duct.

I have found that the auxiliary pistons are automatically lubricated by oil from the walls of the main cylinders driven against the walls of the auxiliary cylinders by the force of the explosions. For this reason substantially no attention need be paid to the auxiliary pistons after they are once assembled. The wear on them is very slight owing to the fact that they move only when conditions of load change.

From the above description it will be seen that I have provided a new form of internal combustion engine with an automatic means to adjust the size of the combustion space for varying conditions of load, so that the engine may be operated with substantially maximum efficiency at all times. This is in contrast to the ordinary engine which operates at maximum efficiency only within certain narrow limits of load and speed. My engine, therefore, when used in an automotive vehicle, will increase the mileage obtainable per gallon of fuel.

Many other desirable results are obtained by my invention. Since the pressures in the combustion chambers never exceed a predetermined value, the engine will operate much cooler than an ordinary engine, with the result that the valves are protected from overheating and greater compression may be used and more power obtained from the fuel. The variable combustion space insures complete combustion and reduces the formation of carbon. Because of the fact that under average and full load conditions the compression may be adjusted to a safe value, ethyl gasoline or other high test fuels are unnecessary and the engine will operate just as well on ordinary gasoline.

Since the engine will operate at high efficiency even when idling, the torque produced at such speeds will be greater than with engines heretofore used. The braking effect of the engine is thus increased, with the result that wear on the brake bands is lessened.

Although a four cylinder engine has been shown in the drawings, any number of cylinders may be used, and while a four cycle engine of the automobile type has been shown, the invention is also adapted to be used with other types of engines, as for instance, the fuel injection type. Also the invention makes it possible to adapt the engine to other types of fuels, since the tension of the spring in the relief valve may be adjusted for any desired maximum compression and the carbureter or injector may be adjusted for the particular fuel desired.

The invention may easily be applied to existing engines, as the new head containing the auxiliary cylinders and pistons may be made to fit the standard cylinder block. It is therefore necessary only to remove the head from a standard engine and replace it with my new head.

But the auxiliary cylinders and pistons need not be incorporated in the head. It is of course preferable to position the auxiliary cylinders as near as possible to the combustion chambers, but they may be formed in the main cylinder block, or even in an entirely separate unit, as long as they communicate with the combustion chambers and the communicating ducts are large enough to take care of the sudden changes in pressure caused by the explosions.

The invention also permits considerable adjustment of the timing of the explosion, so that it may be timed to occur at, say 15° off of dead center, so that the full force of the explosion may be more efficiently translated into engine torque.

Attention is again directed to the fact that the shock of the explosion is taken up by both the compressed gases behind the auxiliary pistons and the auxiliary shaft upon which the pistons are mounted. When the shaft is near the center position, almost all of the shock is taken by the shaft, while with the eccentric near the center position, almost all the shock is received by the compressed gases. And the change from one to the other is automatic and so smooth that there is substantially no possibility of the auxiliary piston assembly developing chatter or other objectionable noise.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In an internal combustion engine, a cylinder, means to alter the combustion space of said cylinder, means to resist the action of said first-mentioned means to increase the combustion space of said cylinder, and additional mechanical means to resist the action of said first-mentioned means to increase the combustion space of said cylinder, said last-mentioned means having its maximum effectiveness when said combustion space is smallest and largest.

2. In an internal combustion engine, a cylinder, means to alter the combustion space of said cylinder, means to resist the action of said first-mentioned means to increase the size of said combustion space, additional mechanical means to resist the action of said first-mentioned means to increase the size of said combustion space, and means to increase and decrease the effectiveness of said last-mentioned means as the size of said combustion space changes.

3. In an internal combustion engine, a cylinder, a working piston reciprocably mounted in said cylinder, means to increase and decrease the combustion space of said cylinder independent of said working piston, mechanical means to resist the increase of said combustion space when said space is a minimum, and means progressively to decrease said resistance as said means increases the size of said combustion space through a predetermined amount.

4. In an internal combustion engine having a working cylinder provided with a combustion space therein, means to control the size of the combustion space of said cylinder comprising an auxiliary cylinder communicating with said working cylinder, a piston in said auxiliary cylinder adapted to provide a minimum combustion space in said working cylinder when in one extreme position and a maximum combustion space in said cylinder when in the other extreme position, mechanical means to resist movement of said piston when in each of its extreme positions, and means progressively to decrease the resistance of said mechanical means to the movement of said piston as said piston approaches its center of movement.

5. In an internal combustion engine having a working cylinder provided with a combustion space therein, means to control the size of the combustion space of said cylinder comprising an auxiliary cylinder communicating with said working cylinder, a piston in said auxiliary cylinder adapted to provide a minimum combustion space in said working cylinder when in one extreme position and a maximum combustion space in said working cylinder when in the other extreme position, mechanical means to resist movement of said piston when in each of its extreme positions, means progressively to decrease the resistance of said mechanical means to the movement of said piston as the piston approaches its center of movement, and means to close the opposite end of said auxiliary cylinder.

6. In an internal combustion engine having a working cylinder provided with a combustion space therein and an intake manifold associated therewith, means to control the size of the combustion space of said cylinder comprising an auxiliary cylinder communicating with said working cylinder, a piston in said auxiliary cylinder adapted to provide a minimum combustion space in said working cylinder when in one extreme position and a maximum combustion space in said working cylinder when in the other extreme position, mechanical means to resist movement of said piston when in each of its extreme positions, means progressively to decrease the resistance of said mechanical means to the movement of said piston as the piston approaches its center of movement, means to close the opposite end of said auxiliary cylinder, and means to control said last-mentioned means by the pressure in said intake manifold.

7. In an internal combustion engine having a working cylinder provided with a combustion space therein, means to control the size of the combustion space of said cylinder comprising an auxiliary cylinder communicating with said working cylinder, a piston in said auxiliary cylinder adapted to provide a minimum combustion space in said working cylinder when in one extreme position and a maximum combustion space in said cylinder when in the other extreme position, mechanical means to resist movement of said piston when in each of its extreme positions, means progressively to decrease the resistance of said mechanical means to the movement of said piston as the piston approaches its center of movement, means to close the opposite end of said auxiliary cylinder, and means associated with the closed end of said auxiliary cylinder to maintain the pressure below a value which would cause detonation by producing too high a compression in said combustion space.

8. In an internal combustion engine having a plurality of working cylinders, a plurality of auxiliary cylinders, there being one associated with each of said working cylinders, a piston reciprocably mounted in each of said auxiliary cylinders and adapted at one limit of its reciprocation to maintain a minimum combustion space in the associated working cylinder and at the other limit of its reciprocation to maintain a maximum combuston space in said working cylinder, and mechanical means to connect said pistons together for simultaneous reciprocation in their respective cylinders, said means being arranged to offer resistance to the movement of said auxiliary pistons at the limits of the reciprocation and to progressively decrease said resistance as said auxiliary pistons move in either direction towards their center of reciprocation.

9. In an internal combustion engine having a plurality of working cylinders, an auxiliary cylinder associated with each of said working cylinders, a piston reciprocably mounted in each of said auxiliary cylinders and adapted at one limit of its reciprocation to maintain a minimum combustion space in the associated working cylinder and at the other limit of its reciprocation to maintain a maximum combustion space in said working cylinder, mechanical means to connect said pistons together for simultaneous reciprocation in their respective cylinders, said means being arranged to offer resistance to the movement of said pistons at the limits of the reciprocation thereof and to progressively decrease said resistance as said pistons move in either direction towards their center of reciprocation, means to close the opposite ends of said auxiliary cylinders, and communicating means to connect the closed ends of said auxiliary cylinders together.

10. In an internal combustion engine having a plurality of working cylinders, an auxiliary cylinder associated with each of said working cylinders, a piston reciprocably mounted in each of said auxiliary cylinders and adapted at one limit of its reciprocation to maintain a minimum combustion space in the associated working cylinder and at the other limit of its reciprocation to maintain a maximum combustion space in said working cylinder, mechanical means to connect said pistons together for simultaneous reciprocation in their respective cylinders, said means being arranged to offer resistance to the movement of said pistons at the limits of the reciprocation thereof and to progressively decrease said resistance as said pistons move in either direction towards their center of reciprocation, means to close the opposite ends of said auxiliary cylinders, and means to maintain the pressure in the closed ends of said auxiliary cylinders below a value which would cause detonation by producing too high a compression in said combustion space.

11. In an internal combustion engine, a working cylinder, an auxiliary cylinder opening into said working cylinder, a piston in said auxiliary cylinder, mechanical means to resist the movement of said piston at the limits of movement thereof and to increase such resistance as the piston approaches the limit of movement in either direction, means to close the outer end of said auxiliary cylinder, communicating means connecting the space at one end of said auxiliary piston with the space at the other end thereof, and a valve in said communicating means permitting fluid to pass from said combustion space to the space at the other end of said piston but preventing it from passing in the other direction.

BERNARD C. FISHER.